(12) United States Patent
Fujiwara (10) Patent No.: US 7,848,539 B2
(45) Date of Patent: *Dec. 7, 2010

(54) IMAGE PROCESSING APPARATUS, CONTROL METHOD FOR THE IMAGE PROCESSING APPARATUS, AND STORAGE MEDIUM STORING COMPUTER PROGRAM FOR EXECUTING THE CONTROL METHOD OF THE IMAGE PROCESSING APPARATUS

(75) Inventor: Takafumi Fujiwara, Sumida-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

This patent is subject to a terminal disclaimer.

(21) Appl. No.: 12/419,190

(22) Filed: Apr. 6, 2009

(65) Prior Publication Data

US 2009/0268971 A1    Oct. 29, 2009

Related U.S. Application Data

(63) Continuation of application No. 11/464,889, filed on Aug. 16, 2006, now Pat. No. 7,532,739.

(30) Foreign Application Priority Data

Sep. 1, 2005    (JP)    ............... 2005-254008

(51) Int. Cl.
    *G06K 9/36* (2006.01)
(52) U.S. Cl. .................................. 382/100; 382/284
(58) Field of Classification Search ................ 382/100, 382/232, 284; 358/3.28, 450; 399/366; 713/176
    See application file for complete search history.

(56) References Cited

U.S. PATENT DOCUMENTS

| 7,532,739 B2 * | 5/2009 | Fujiwara | 382/100 |
| 2004/0003394 A1 * | 1/2004 | Ramaswamy | 725/28 |
| 2005/0074184 A1 * | 4/2005 | Matsumoto et al. | 382/284 |

* cited by examiner

*Primary Examiner*—Andrew W Johns
(74) *Attorney, Agent, or Firm*—Canon USA Inc. IP Division (57) ABSTRACT

An image processing apparatus includes a production unit that can produce data by putting original image data into a first region and copy-forgery-inhibited-pattern image data into a second region, and a processing unit that can perform predetermined processing to the original image data put in the first region. The image processing apparatus further includes a composite image data producing unit that can produce composite image data based on both of the original image data to which the predetermined processing is performed and the copy-forgery-inhibited-pattern image data put in the second region of the data.

12 Claims, 12 Drawing Sheets

IMAGE DATA OF 1 PIXEL

| | | | | | | | | |
|---|---|---|---|---|---|---|---|---|
| 301 | R | R | R | R | R | R | R | R | IMAGE DATA R (8 bits) |
| 302 | G | G | G | G | G | G | G | G | IMAGE DATA G (8 bits) |
| 303 | B | B | B | B | B | B | B | B | IMAGE DATA B (8 bits) |
| 304 | Z | Z | Z | Z | Z | Z | Z | Z | ATTRIBUTE DATA (8 bits) |

FIG.4

CFIP IMAGE DATA
OF 1 PIXEL (1 bit)

VISUALIZATION

| 170 | 180 | 190 | 200 | 210 |
|-----|-----|-----|-----|-----|
| 160 | 40  | 50  | 60  | 220 |
| 150 | 30  | 0   | 70  | 230 |
| 140 | 20  | 10  | 80  | 240 |
| 130 | 110 | 100 | 90  | 250 |

DITHER MATRIX 1

| 10  | 100 | 180 | 60  | 210 |
|-----|-----|-----|-----|-----|
| 170 | 80  | 190 | 200 | 70  |
| 130 | 230 | 20  | 220 | 120 |
| 40  | 160 | 240 | 90  | 150 |
| 140 | 50  | 110 | 250 | 0   |

DITHER MATRIX 2

IMAGE PROCESSING APPARATUS, CONTROL METHOD FOR THE IMAGE PROCESSING APPARATUS, AND STORAGE MEDIUM STORING COMPUTER PROGRAM FOR EXECUTING THE CONTROL METHOD OF THE IMAGE PROCESSING APPARATUS

CROSS-REFERENCE TO RELATED APPLICATIONS

This application is a continuation of U.S. patent application Ser. No. 11/464,889, filed on Aug. 16, 2006, now U.S. Pat. No. 7,532,739, which claims priority to Japanese Patent Application 2005-254008 filed Sep. 1, 2005, the contents of which are hereby incorporated by reference.

BACKGROUND OF THE INVENTION

1. Field of the Invention

The present invention relates to an image processing apparatus configured to combine original image data with copy-forgery-inhibited-pattern image data (hereinafter, referred to as "cfip" image data), and also relates to a control method for the image processing apparatus. Furthermore, the present invention relates to a storage medium configured to store a program enabling a computer to execute the control method for the image processing apparatus.

2. Description of the Related Art

The recent image processing devices, such as scanners, printers, and copying machines, have highly advanced performances that enable an unfair user to make an unauthorized copy of confidential documents, such as copy of official family registration or copy of written private contract. To prohibit such unauthorized copying of confidential documents or use of the copied documents, conventionally, security papers can be used for the printing of confidential documents.

The security papers are special papers including invisible patterns printed thereon beforehand. When a copying machine is used to make a copy of a security paper, the special pattern (e.g., warning letters) printed on the security paper will appear on the copy paper in a visible state.

The security papers can bring an effect of mentally inhibiting a user from making an unauthorized copy of confidential information, such as family registration information and contract information. Furthermore, warning letters appearing on the security paper can clearly differentiate the copy from the original.

Japanese Patent Application Laid-open No. 7-231384 proposes a method for producing a cfip image on an original as warning letters appearing in a visible state when the original is copied. According to this conventional method, when a scanner reads original image and the original image is copied by a recorder, a cfip image is produced and combined on the original image. Thus, ordinary papers are usable to obtain print results comparable to the results obtainable by the security papers.

As described later, the cfip image includes a latent area and a background area. An image of the latent area and an image of the background area, having common reflection density, are produced with different dither matrices.

According to the method discussed in Japanese Patent Application Laid-open No. 7-231384, an image combining section combines the original image and the cfip image. The image combining section and a cfip image producing section are positioned as post-processing sections for an image processing section of the original image. Therefore, the image processing for the original image does not need to be applied to the cfip image. Thus, the conventional method can prevent the cfip image from deteriorating.

Furthermore, Japanese Patent Application Laid-open 2001-346032 proposes a method for providing a transfer path dedicated to a cfip image and a buffer. The cfip image dedicated transfer path is different from a transfer path for the original image. Providing separately the original image transfer path and the cfip image dedicated transfer path can prevent the cfip image from being subjected to the image processing applied to the original image.

As described above, Japanese Patent Application Laid-open No. 7-231384 and Japanese Patent Application Laid-open 2001-346032 use a cfip image dedicated data bus to overcome the problem arising when the processing for the original image data is undesirably applied to the cfip image data. The processing applied to the original image data includes, for example, image processing and data compression/expansion processing.

However, the above-mentioned image processing apparatus including a cfip image dedicated data bus has a complicated structure and may be costly to produce.

In view of the foregoing, it is desired to provide an image processing apparatus that is capable of suppressing deterioration in the quality of the cfip image data and also desired to provide a related control method for the image processing apparatus.

SUMMARY OF THE INVENTION

At least one embodiment of the present invention is directed to a technique capable of overcoming or at least mitigating the above-described problems.

According to one aspect of the present invention, at least one exemplary embodiment provides an image processing apparatus including a production unit, a processing unit, and a composite image data producing unit. The production unit can produce data by putting original image data into a first region and copy-forgery-inhibited-pattern image data into a second region. The processing unit can perform predetermined processing to the data produced by the production unit. The processing unit can perform the predetermined processing to the original image data among the original data put in the first region and the copy-forgery-inhibited-pattern image data put in the second region. And, the composite image data producing unit can produce composite image data based on both of the original image data to which the predetermined processing is performed and the copy-forgery-inhibited-pattern image data put in the second region of the data produced by the production unit.

According to another aspect of the present invention, at least one exemplary embodiment provides a control method for an image processing apparatus. The method includes putting original image data into a first region and putting copy-forgery-inhibited-pattern image data into a second region, to produce data. After which, the method performs predetermined processing to the produced data. The predetermined processing is performed to the original image data among the original data put in the first region and the copy-forgery-inhibited-pattern image data put in the second region. The method further includes producing composite image data based on both of the original image data to which the predetermined processing is performed and the copy-forgery-inhibited-pattern image data put in the second region of the data.

According to another aspect of the present invention, at least one exemplary embodiment provides an image processing apparatus configured to produce composite image data including original image data and copy-forgery-inhibited-pattern image data. The image processing apparatus includes a replacement unit and a combination unit. The replacement unit can replace a part of attribute data corresponding to the original image data by the copy-forgery-inhibited-pattern image data. And, the combination unit can produce composite image data based on the attribute data replaced by the replacement unit and the original image data corresponding to the replaced attribute data.

According to another aspect of the present invention, at least one exemplary embodiment provides a control method for an image processing apparatus configured to produce composite image data including original image data and copy-forgery-inhibited-pattern image data. The method includes replacing a part of attribute data corresponding to the original image data with the copy-forgery-inhibited-pattern image data, and producing composite image data based on the attribute data being replaced and the original image data corresponding to the replaced attribute data.

According to another aspect of the present invention, at least one exemplary embodiment provides a storage medium storing a program readable by a computer to enable the computer to execute the above-described control method for the image processing apparatus.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

The following description of exemplary embodiments is merely illustrative in nature and is in no way intended to limit the invention, its application, or uses.

Processes, techniques, apparatus, and materials as known by one of ordinary skill in the art may not be discussed in detail but are intended to be part of the enabling description where appropriate.

For example, certain circuitry for signal processing, calculating, and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is defined in one figure, it may not be discussed for following figures.

Exemplary embodiments will be described in detail below with reference to the drawings.

First Exemplary Embodiment

Figure 1:
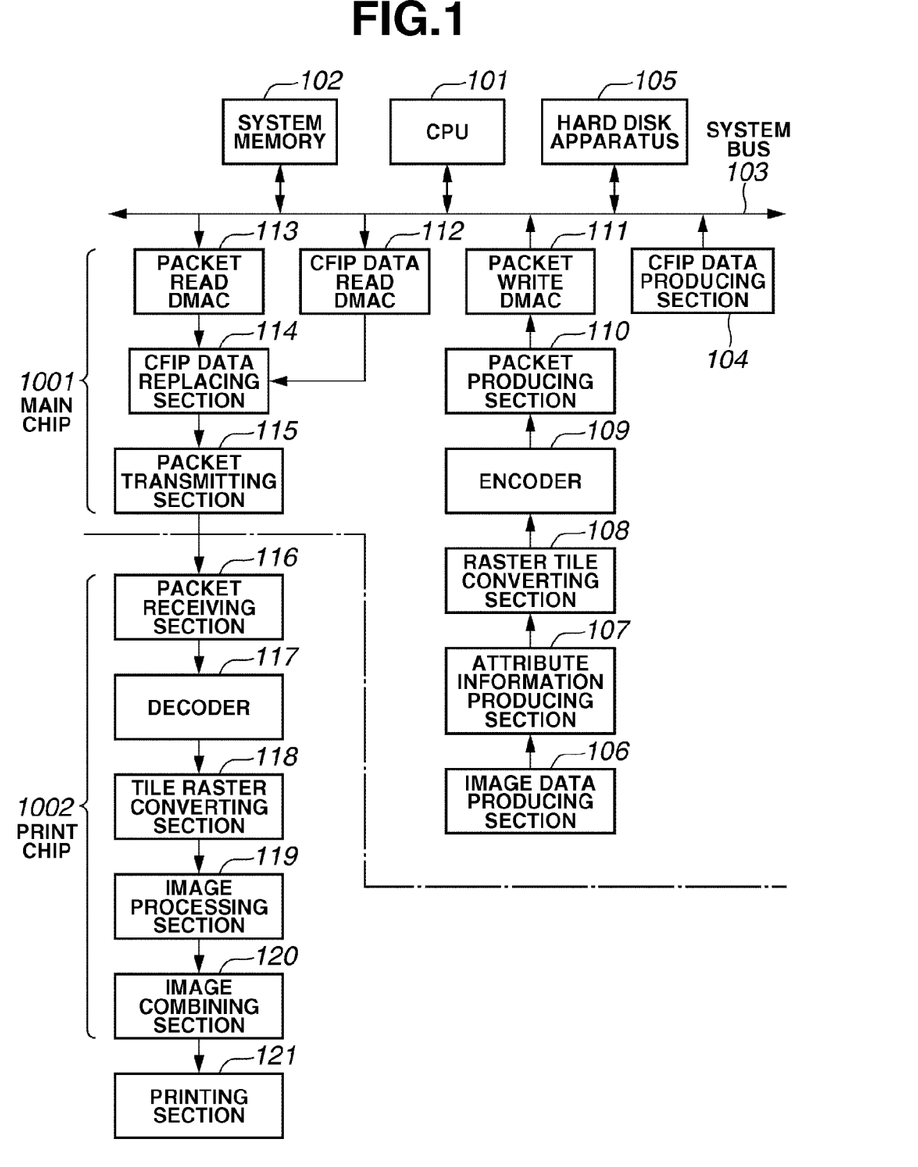
FIG. 1 is a block diagram illustrating an arrangement of an image processing apparatus in accordance with a first exemplary embodiment of the present invention.

FIG. 1 is a block diagram illustrating an arrangement of an image processing apparatus in accordance with a first exemplary embodiment of the present invention. The image processing apparatus according to the first exemplary embodiment is a copying machine including a printing section 121 and a scanner section (not shown).

The copying machine includes a main chip 1001 (e.g., LSI) and a print chip 1002, which can cooperatively execute various processing relating to generation of composite image data.

A CPU 101 can control the main chip 1001 and the print chip 1002 via a system bus 103. A system memory 102 and a hard disk apparatus 105 can store programs of the CPU 101 as well as original image data, attribute data, and copy-forgery-inhibited-pattern image data (i.e., cfip image data).

A cfip data producing section 104 can produce cfip image data based on cfip image settings (e.g., settings relating to colors and hidden characters) being set by a user. The system memory 102 can store the produced cfip image data.

The produced cfip image data is a bit map data of 1 bit including a latent area and a background area. More specifically, the cfip data producing section 104 can produce cfip image data based on two types of dither matrices and a character string pattern, such as "COPY," or a contour pattern that can separate the latent area and the background area. A user can set the character string pattern and the contour pattern. The system memory 102 can store the dither matrices beforehand.

The cfip image includes an area "remaining" on a copy and an area "disappearing" from the copy (or an area being thinned in density compared to the "remaining" area). The "remaining" area and the "disappearing" area are substantially identical with each other in reflection density on the original. Therefore, human eyes cannot recognize the presence of a hidden character string, such as "COPY."

In the present exemplary embodiment, the "remaining" area is an area where the image of an original can be accurately reproduced on the copy. In contrast, the "disappearing" area is an area where the image of an original cannot be reproduced on the copy. In practice, a reflection density meter can be used to measure the reflection density.

In the context of the present disclosure, the area "remaining" on the copy is referred to as a "latent area." The area "disappearing" from the copy (or the area being thinned in density compared to the "remaining" area) is referred to as a "background area."

Figure 9:
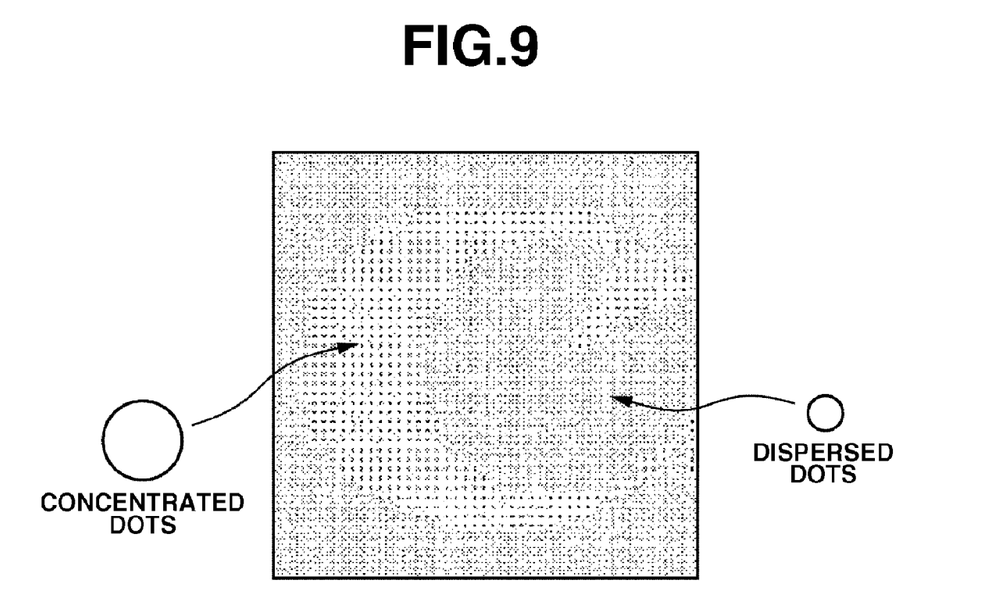
FIG. 9 is a view showing an example of a cfip image.

FIG. 9 shows an exemplary dot pattern of the cfip image. In FIG. 9, a concentrated dot area is the latent area and a dispersed dot area is the background area. The two different dot areas can be produced using different dot processing or different dither processing.

For example, lower line number dot processing can be used to produce the dots in the latent area and a higher line number dot processing can be used to produce the dots in the background area. Alternatively, a dot concentrated type dither matrix can be used to produce the dots in the latent area. A dot dispersed type dither matrix can be used to produce the dots in the background area.

In general, the reproduction capability of a copying machine is dependent on the input resolution or the output resolution of the copying machine. Accordingly, the reproduction capability of a copying machine is limited by the input resolution and/or the output resolution thereof.

Therefore, when the dot in the latent area has the size larger than "a dot reproducible by a copying machine" and the dot in the background area is smaller than the "dot reproducible by a copying machine," the dots in the latent area can be reproduced on the copy and the dots in the background area cannot be reproduced.

As a result, the latent area reproduced on the copy can be recognized as an area having higher density compared to the background area. By applying this technique, a hidden character string can appear in a visible state as shown in FIG. 10B. This phenomenon can be referred to as "visualization."

Figure 10A:
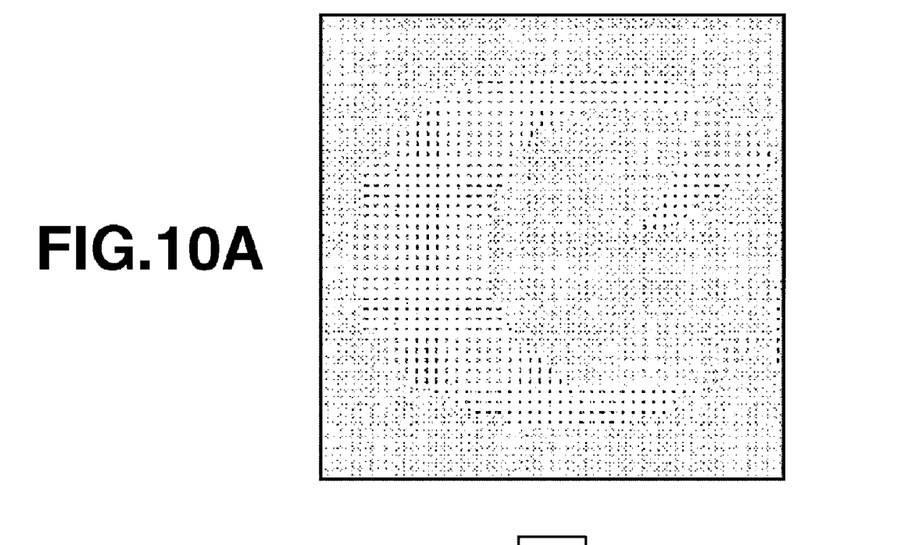
FIGS. 10A and 10B are views showing an example of practical visualization.
Figure 10B:
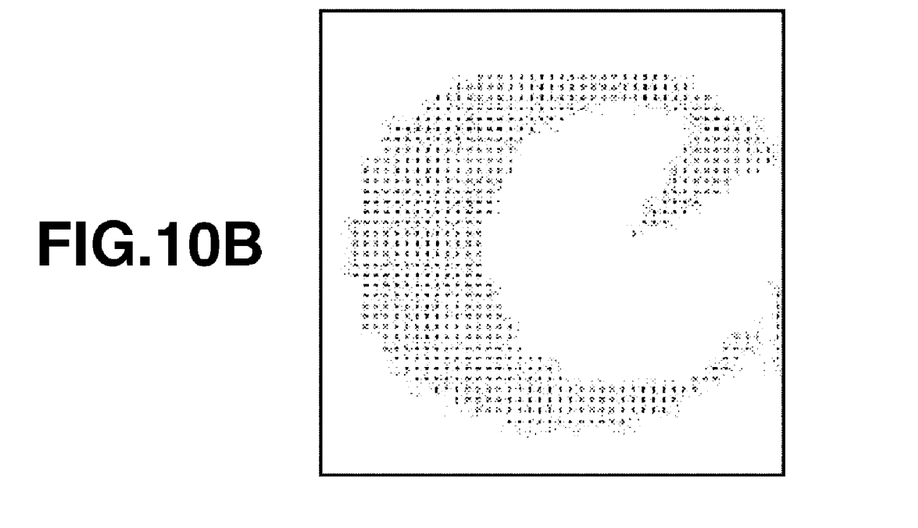

FIGS. 10A and 10B show an example of the visualization, schematically illustrating concentrated dots (i.e., large dots) being reproduced on a copy and dispersed dots (i.e., small dots) not being accurately reproduced on the copy.

The present exemplary embodiment does not structurally limit the cfip image and can use any type of cfip image, including a character string (e.g., "COPY"), a sign, or a pattern, as long as it can appear (i.e., visualize) in a visible state on a copy. For example, the cfip image can include the character string, such as "COPY" shown as outline characters (or letters) on a colored peripheral area. In this case, the area of the outline character string "COPY" can be referred to as the background area.

An image data producing section 106 can perform predetermined conversion processing applied to the data obtainable from the scanner (not shown) and can produce original image data. The original image data are associated with raster images.

An attribute information producing section 107 can analyze the produced original image data, and can allocate an attribute to each pixel. For example, the attribute information producing section 107 can allocate a character attribute to each pixel constituting a character (or a letter) and can allocate a photo attribute to each pixel constituting a photo (or a natural image).

The attribute data representing a character attribute and/or a photo attribute can be used in a later-described image processing section 119 that can realize high quality image processing. As described later, the first exemplary embodiment prepares an 8-bit region for accommodating attribute data of each pixel. However, the first embodiment of the present invention can use any other suitable bit number region.

However, unless the LSI is reconstructed, it may be impossible to change the maximum bit number used for accommodating the attribute data, because the LSI has a limited number of data buses available for transferring the attribute data. In the present exemplary embodiment, the attribute data include the data other than brightness information and density information. More specifically, the attribute data represent the attribute of an image, such as the character attribute and the photo attribute.

Figure 3:
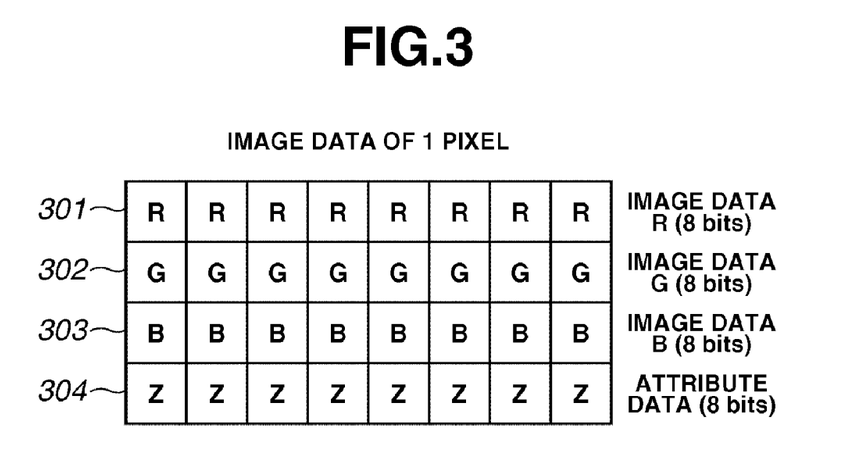
FIG. 3 is a view showing a data region of one pixel in accordance with an embodiment of the present invention.

FIG. 3 is a view schematically showing a data region required for accommodating the data of one pixel in accordance with an embodiment of the present invention. The data of one pixel includes 8-bit R (red) image data, 8-bit G (green) image data, 8-bit B (blue) image data, and 8-bit attribute data. A data region 301 can accommodate the red (R) image data. A data region 302 can accommodate the green (G) image data. A data region 303 can accommodate the blue (B) image data.

Furthermore, a data region 304 can accommodate the attribute data. The 8-bit attribute data includes a least significant bit positioned at the rightmost end of the data region 304 and a most significant bit positioned at the leftmost end of the data region 304. In the following description, the least significant bit and the most significant bit are referred to as LSB and MSB, respectively.

A raster tile converting section 108 can divide raster data of one page produced from the image data producing section 106 into a plurality of tile data. Furthermore, the raster tile converting section 108 can send the tile data and the attribute data to an encoder 109.

Figure 2:
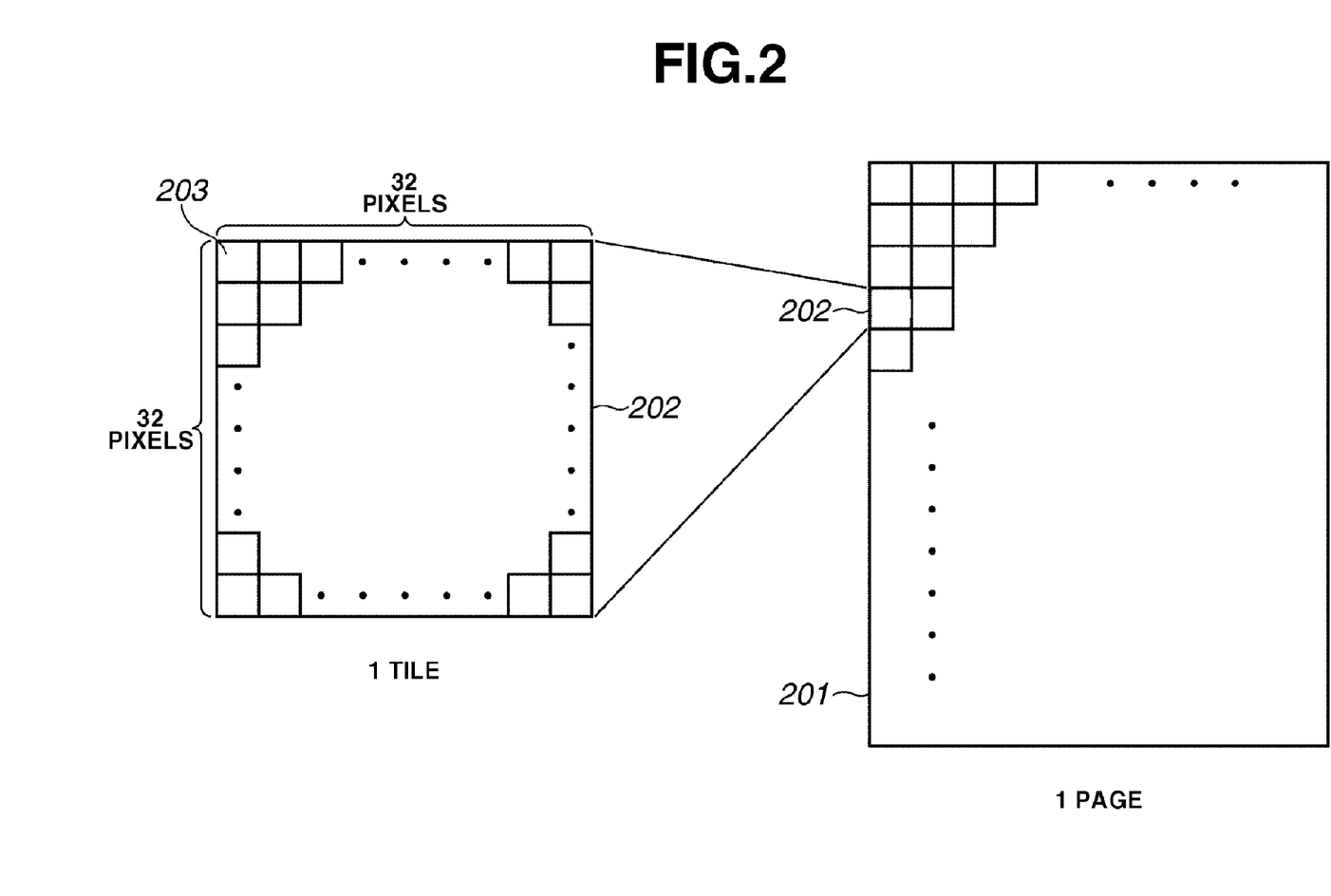
FIG. 2 is a view schematically illustrating raster data of one page which can be divided into a plurality of tile data in accordance with the first exemplary embodiment.

FIG. 2 is a view schematically illustrating the configuration of the raster data and the tile data, i.e., raster data 201 of one page, including plural tile data 202, each consisting of 32 pixels×32 pixels, each pixel including data 203.

The encoder 109 can compress the tile data using a lossy compression method (e.g., JPEG method), and can compress the attribute data corresponding to the tile data using a lossless compression method (e.g., packbit method). Then, the encoder 109 can send the compressed data to a packet producing section 110. The data compression can reduce a required capacity of the system memory 102.

In general, the original image data is robust against the lossy compression because the quality of the original image data can be substantially maintained. In one implementation, this is the reason why the JPEG method or comparable lossy compression is applied to the original image data.

On the other hand, the attribute data is vulnerable against the lossy compression. Thus, to protect the attribute of each pixel, the lossless compression is applied to the attribute data.

In general, the size of compressed data is variable dependent on the data size of a compression object. Furthermore, it is difficult to control or predict the size of compressed data beforehand. Therefore, although the system memory 102 can define a memory region capable of storing compression data of on page, the compressed data size may exceed a predefined memory region.

In this case, it is required to first delete the compressed data and then change the compression parameters of the encoder 109 to perform the compression processing again to the non-compressed data. This processing procedure is repeated until the compressed data can be fully stored in the predefined memory region.

Through the above-described processing, reproducibility of the lossy compressed data gradually deteriorates. In other words, the quality of the original image data deteriorates.

In the first exemplary embodiment, the original image data can be produced based on a scanned original, or based on any other suitable sources. For example, the present exemplary embodiment can produce original image data by performing rendering processing applied to PDL (page description language) data transmitted from a host. In this case, the attribute data can be produced based on produced original image data using a method similar to the method based on a scanned original, or can be produced based on object data involved in the PDL data.

The packet producing section 110 can perform packing processing applied to the lossy compressed original image data and to the lossless compressed attribute data in units of a tile, and can produce packet data.

Figure 11:
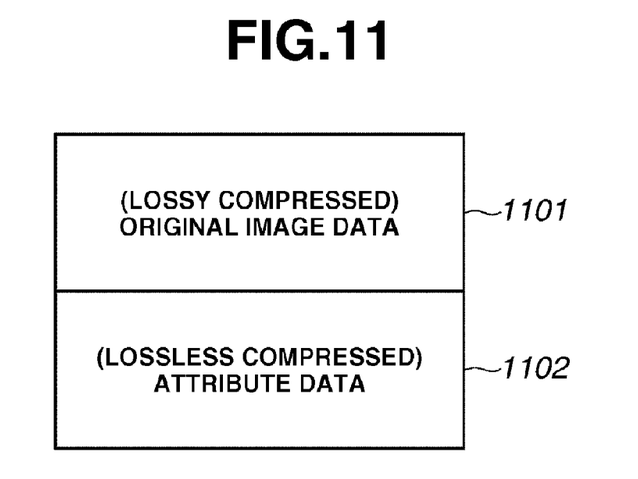
FIG. 11 is a view schematically showing exemplary packet data in accordance with an embodiment of the present invention.

FIG. 11 is a view schematically showing an example of the packet data, including lossy compressed original image data 1101 and lossless compressed attribute data 1102.

A packet write DMAC (direct memory access controller) 111 can receive the packet data produced from the packet producing section 110 and send the packet data to the system memory 102 that can store the packet data. The packet data stored in the system memory 102 is once sent to the hard disk apparatus 105 that can store the packet data. This processing procedure can be referred to as a "disk spool." The present exemplary embodiment executes the disk spool in some cases and skips the disk spool in some cases.

A packet read DMAC 113 can successively read the packet data from the system memory 102 and can send the readout packet data to a cfip data replacing section 114.

The cfip data replacing section 114 can execute the following processing.

In the present exemplary embodiment, ordinary print settings are referred to as the settings for directly outputting the original image data which are not combined with the cfip image data. The ordinary print settings require the cfip data replacing section 114 to do nothing but directly send the received packet data to a packet transmitting section 115.

On the other hand, cfip print settings are referred to as the settings for combining the original image data with the cfip image data to form a composite image. The cfip print settings require the packet read DMAC 113 to send the packet data of the system memory 102 to the cfip data replacing section 114.

Furthermore, while the packet read DMAC 113 is performing the transmission processing, a cfip data read DMAC 112 can send the cfip image data of the system memory 102 to the cfip data replacing section 114. The cfip image data has a tile format of 32 pixels×32 pixels and is stored beforehand in the system memory 102.

Figure 4:
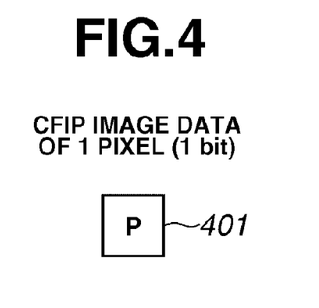
FIG. 4 is a view showing exemplary copy-forgery-inhibited-pattern image data (i.e., cfip image data) of one pixel in accordance with the first exemplary embodiment of the present invention.

FIG. 4 shows exemplary cfip image data 401 of one pixel in accordance with an embodiment of the present invention. As shown in FIG. 4, one pixel of the cfip image data 401 is constituted by 1-bit data. For example, a value "1" can be allocated to 1-bit data when a corresponding pixel is a dot, and a value "0" is allocated to 1-bit data when a corresponding pixel is not a dot.

Figure 5:
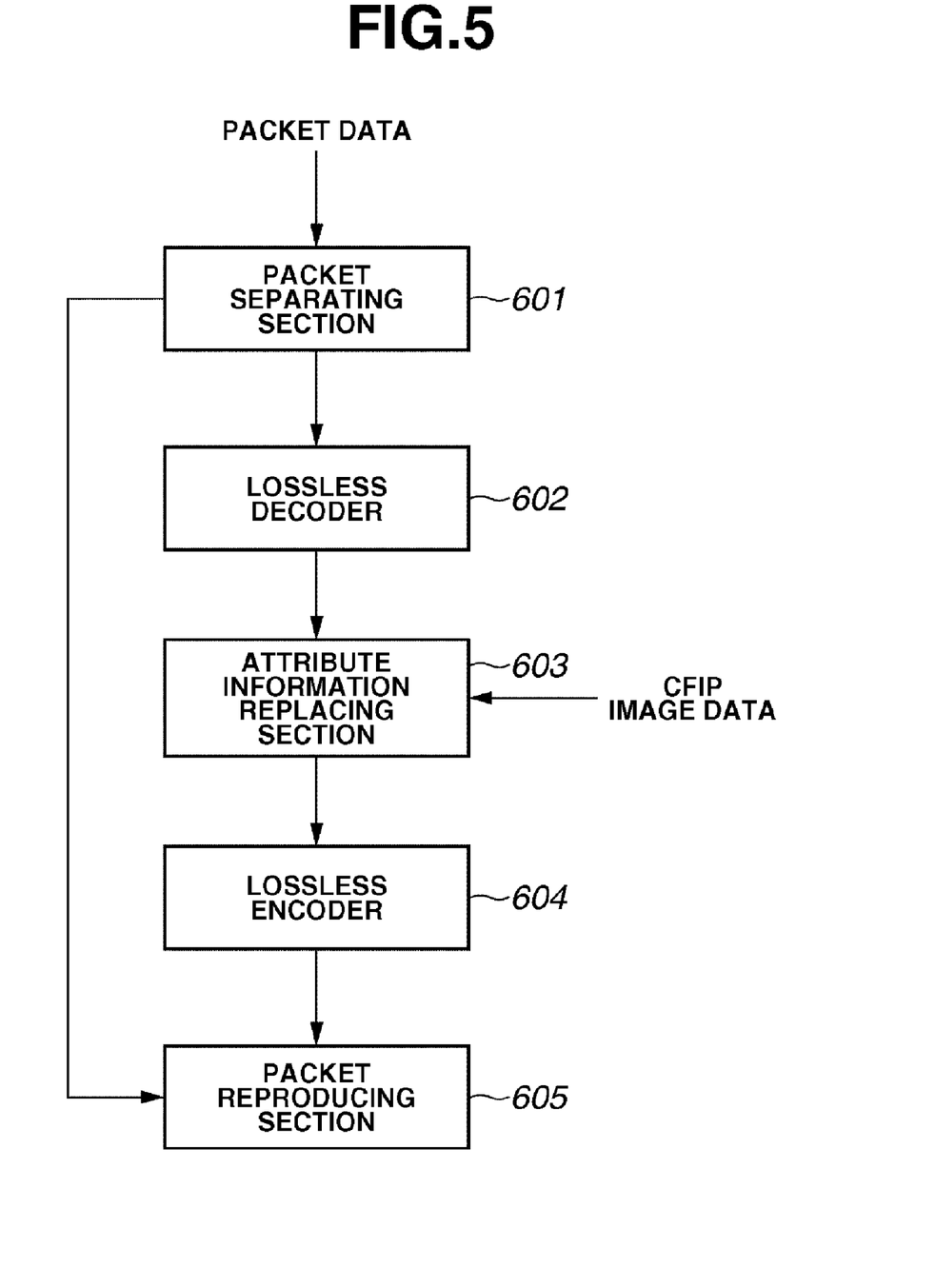
FIG. 5 is a block diagram illustrating an arrangement of a cfip data replacing section shown in FIG. 1 in accordance with an embodiment of the present invention.

FIG. 5 is a block diagram illustrating a detailed arrangement of the cfip data replacing section 114 in accordance with an embodiment of the present invention. The cfip data replacing section 114 includes a packet separating section 601, a lossless decoder 602, an attribute information replacing section 603, a lossless encoder 604, and a packet reproducing section 605.

The packet separating section 601 separates the received packet data into lossy compressed original image data and lossless compressed attribute data. No expansion processing is applied to the original image data. The original image data is directly sent to the packet reproducing section 605.

On the other hand, the attribute data is sent to the lossless decoder 602 that can perform expansion processing applied to the attribute data. With the expansion processing, the lossless decoder 602 can produce attribute data completely including the original contents.

Figure 12:
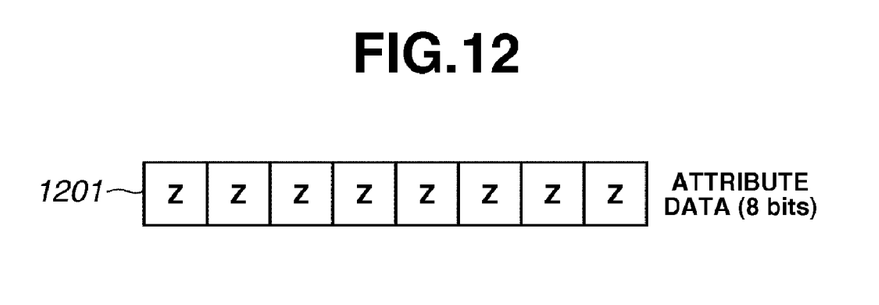
FIG. 12 is exemplary attribute data region for accommodating attribute data in accordance with an embodiment of the present invention.

FIG. 12 shows an exemplary attribute data region 1201 that accommodates expanded attribute data in accordance with an embodiment of the present invention.

The lossless decoder 602 sends the expanded attribute data to the attribute information replacing section 603. The attribute information replacing section 603 not only receives the expanded attribute data from the lossless decoder 602 but also receives the cfip image data from the cfip data read DMAC 112. Then, the attribute information replacing section 603 performs the processing for putting the cfip image data into a 1-bit position of the attribute data region 1201.

Figure 6:
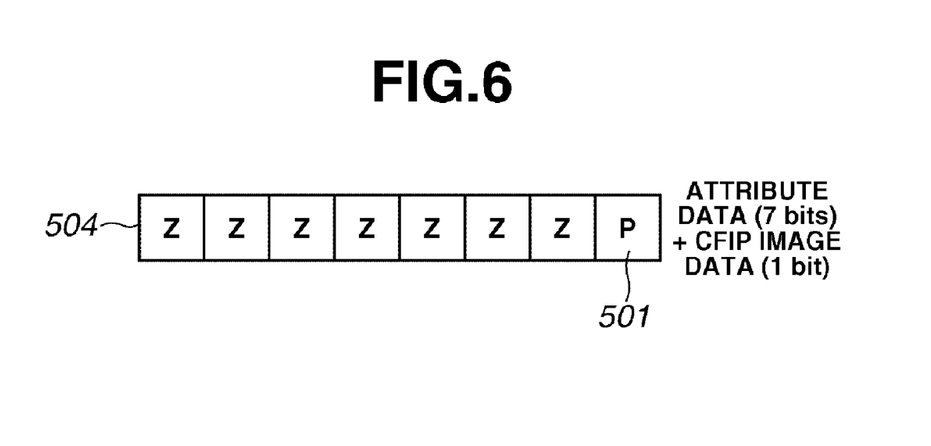
FIG. 6 is a view showing exemplary attribute data region for accommodating attribute data and cfip image data in accordance with an embodiment of the present invention.

FIG. 6 is a view showing exemplary attribute data region 504 of one pixel, in accordance with an embodiment of the present invention, which is similar to the attribute data region 304 of FIG. 3 or the attribute data region 1201 of FIG. 12. The attribute data region 504 can accommodate cfip image data 501 and the attribute data resulting from the above-described processing of the attribute information replacing section 603.

More specifically, the cfip image data 501 is put in a 1-bit position of the attribute data region 504 that can be inherently used to accommodate part of the attribute data. In the present exemplary embodiment, if the attribute data region 504 is fully occupied with the attribute data (i.e., if there is no vacant region), 1-bit of attribute data can be overwritten (i.e., deleted and replaced) by the cfip image data 501. Furthermore, when the attribute data region 504 includes a vacant region, the cfip image data 501 can be directly put into the vacant region.

As described above, there are two cases in the process of putting the cfip image data 501 into the attribute data region 504. The processing in each case can be referred to as "replacement processing." In the present exemplary embodiment, no lossy compression is applied to the cfip image data 501 involved in the attribute data. Accordingly, the present exemplary embodiment can prevent the cfip image from appearing on the original as warning letters in a visible state.

When the replacement processing is accomplished, the attribute information replacing section 603 sends the data (including the cfip image data) of the attribute data region 504 to the lossless encoder 604.

The lossless encoder 604 can perform lossless compression in units of a tile of 32 pixels×32 pixels. Then, the lossless encoder 604 sends the lossless compressed attribute data to the packet reproducing section 605. The packet reproducing section 605 can pack the data in the attribute data region being lossless compressed by the lossless encoder 604 and the original image data being separated by the packet separating section 601, to reconstruct packet data.

Figure 13:
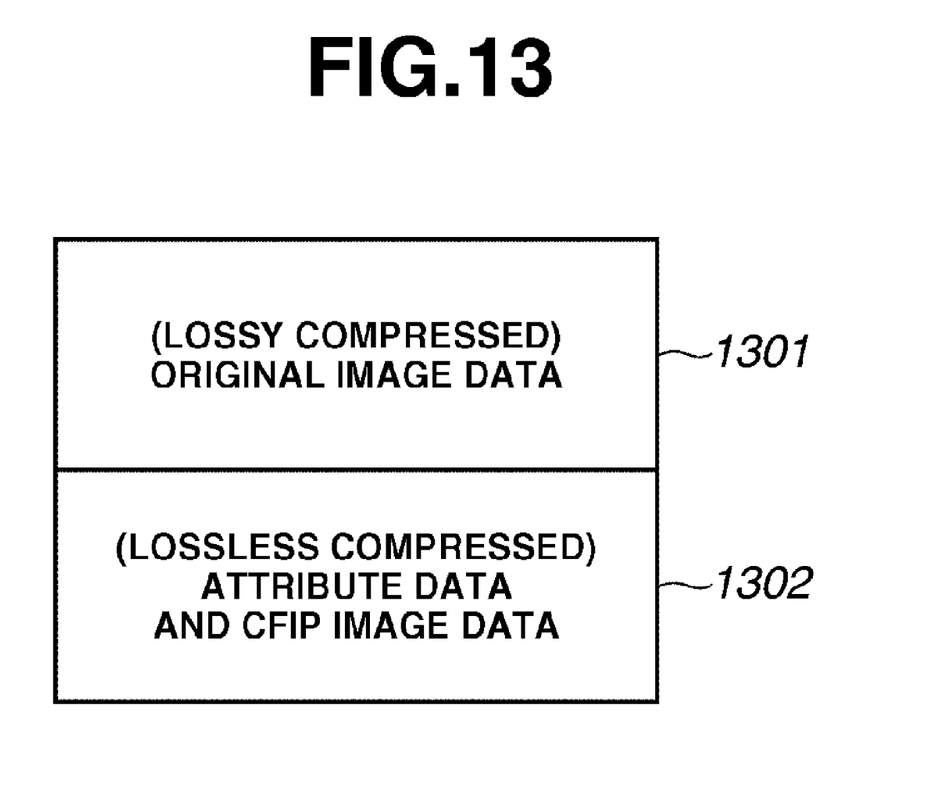
FIG. 13 is a view showing reproduced packet data in accordance with an embodiment of the present invention.

Then, the reproduced packet data is sent to the packet transmitting section 115. FIG. 13 shows the reproduced packet data including lossy compressed original image data 1301 and lossless compressed attribute data 1302.

In the first exemplary embodiment, the image processing system is constituted by two or more LSIs. Furthermore, as described above, the main chip 1001 is one LSI to which the system memory 102 is connected and the print chip 1002 is another LSI to which the printing section 121 is connected. At the boundary of two chips 1001 and 1002, the packet transmitting section 115 is connected to the packet receiving section 116.

The packet transmitting section 115 of the main chip 1001 transmits the packet data to the packet receiving section 116 of the print chip 1002. The packet receiving section 116 sends the packet data to a decoder 117. If the main chip 1001 and the print chip 1002 can be constituted by a single LSI, the present exemplary embodiment does not require the packet transmitting section 115 and the packet receiving section 116.

The decoder 117 can expand the lossy compressed original image data and the lossless compressed attribute data included in the packet data.

Then, a tile raster converting section 118 can convert the tile data into raster data. The image processing section 119 can perform predetermined image processing to the original image data being converted into a raster data format. In this case, the original image data (i.e., 8-bit R data, 8-bit G data, and 8-bit B data) is converted into CMYK data each being 8-bit data.

Furthermore, the image processing section 119 can perform pseudo-halftone processing applied to the CMYK data each being 8-bit data, to finally obtain CMYK data each being 1-bit data.

In this manner, the original image data placed on 3 planes of RGB colors can be put on 4 planes of CMYK colors. In the present exemplary embodiment, the plane of C color is an area where brightness information of cyan involved in the image data is placed. Furthermore, the plane of C color may represent the brightness data itself of the cyan involved in the original image data. Same or similar process can be applied to other color planes.

In the present exemplary embodiment, the image processing applied to the original image data by the image processing section 119 is the image processing using the attribute data (e.g., character attribute and photo attribute) of each pixel. Accordingly, the present exemplary embodiment can differentiate the image processing applied to the original image data for each pixel (i.e., can optimize the image processing for each attribute).

Figure 14:
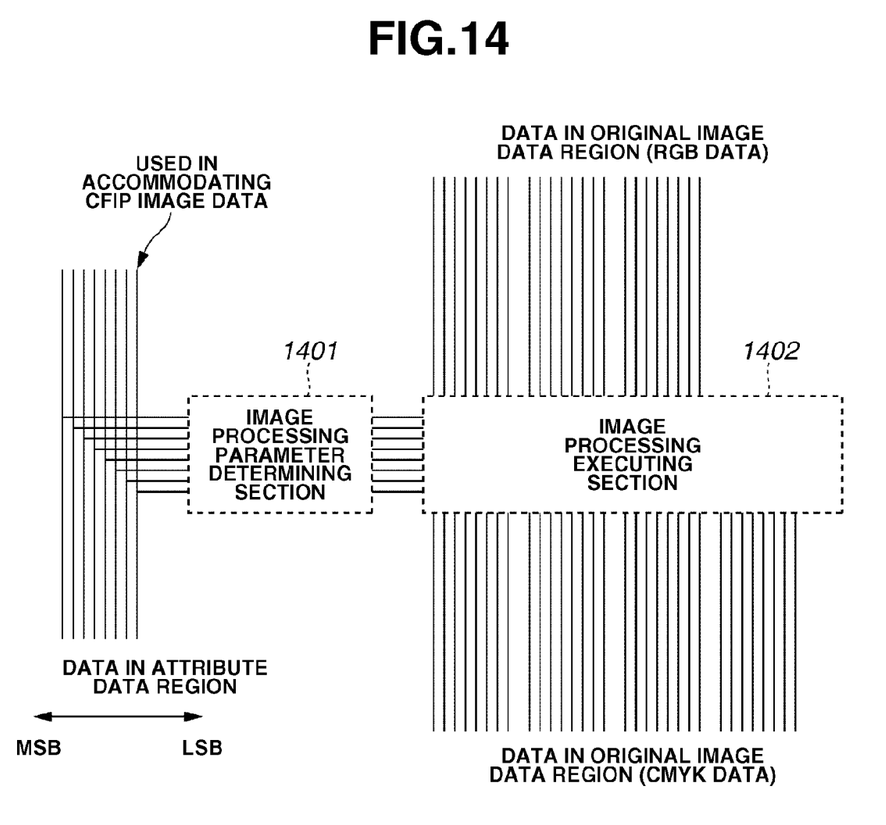
FIG. 14 is a view schematically showing an exemplary arrangement of an image processing section shown in FIG. 1 in accordance with an embodiment of the present invention.

FIG. 14 is a view schematically showing an exemplary arrangement of the image processing section 119. As shown in the drawing, the image processing section 119 includes an image processing parameter determining section 1401, an image processing executing section 1402, and a data bus.

The image processing parameter determining section 1401 can determine, according to the data involved in a received attribute data region, image processing parameters applied to the data of a pixel corresponding to the attribute data (i.e., a corresponding pixel of the original image data).

The image processing parameters include, for example, dither matrices used in the dither processing applied to original image data. Furthermore, the image processing parameters include filter coefficients used in the filter processing applied to the original image data. Furthermore, the image processing parameters include color space coefficients used for converting the RGB color space into the CMYK color space.

Figure 15:
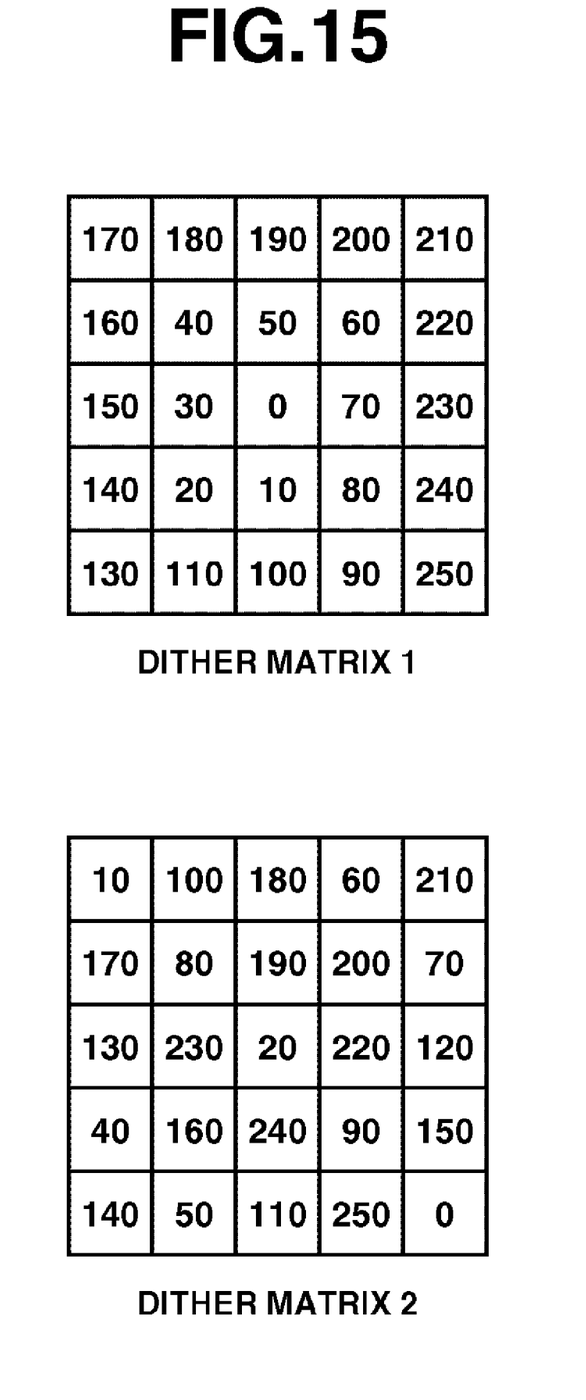
FIG. 15 is a view showing exemplary dither matrices in accordance with an embodiment of the present invention.

FIG. 15 is a view showing exemplary dither matrices used in the operation of the image processing parameter determining section 1401. For example, when the MSB data in the attribute data region represents a "character (or letter)," the image processing parameter determining section 1401 allocates a dither matrix 1 to a corresponding pixel. Furthermore, when the MSB data in the attribute data region represents a "photo," the image processing parameter determining section 1401 allocates a dither matrix 2 to a corresponding pixel.

As described above, the image processing parameter determining section 1401 can determine the image processing parameters to be applied to the data of a corresponding pixel in the original image data.

The image processing executing section 1402 can perform predetermined image processing applied to the RGB original image data with the image processing parameters determined by the image processing parameter determining section 1401, and can produce CMYK original image data.

In the case of cfip print settings, the present exemplary embodiment performs the image processing only to the original image data and does not perform image processing to the cfip image data, because the cfip image data is put in the attribute data region. As a result, the quality of the cfip image does not deteriorate in the image processing section 119. The present exemplary embodiment can prevent the cfip image from appearing on the original as warning letters in a visible state.

As described above, the first exemplary embodiment can prevent the cfip image data from being subjected to the image processing, while transferring the cfip image data using an existing data bus (i.e., data bus used for transferring attribute data). Furthermore, the first exemplary embodiment can output the cfip image data having higher quality to an image combining section 120.

In the case of ordinary print settings, the image combining section 120 receives the original image data from the image processing section 119 which applied the image processing to the original image data. The image combining section 120 sends the original image data to the printing section 121 without performing any processing applied to the original image data.

On the other hand, in the case of the cfip print settings, the image combining section 120 performs the following processing.

Figure 7:
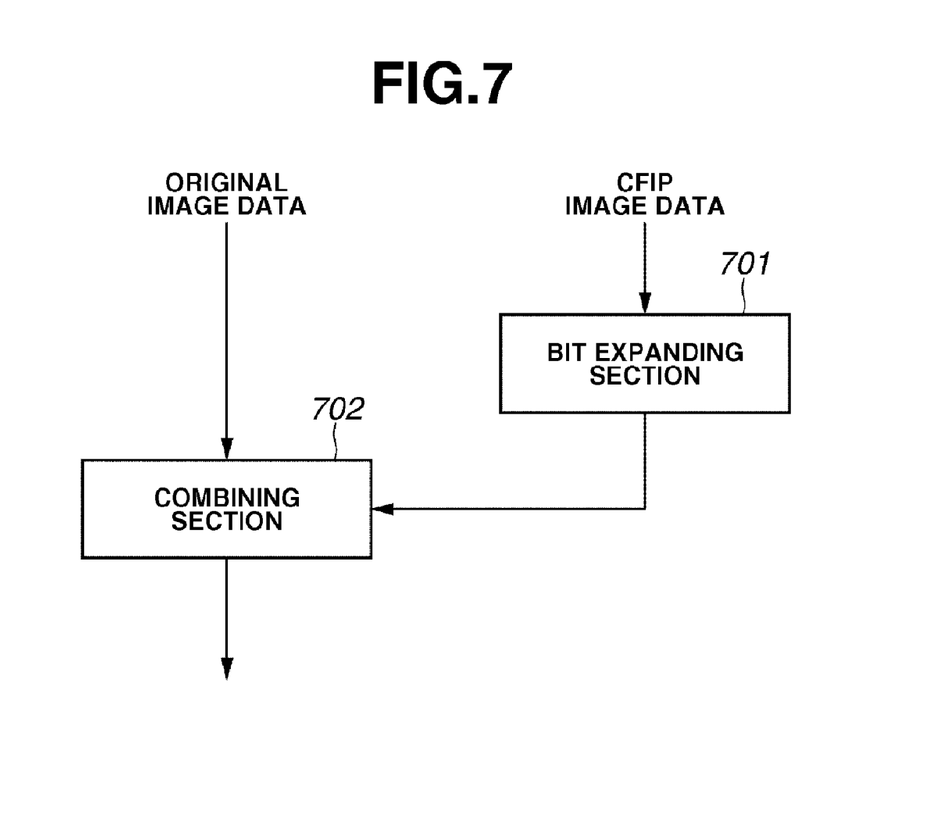
FIG. 7 is a block diagram illustrating an arrangement of an image combining section shown in FIG. 1 in accordance with an embodiment of the present invention.

FIG. 7 is a block diagram illustrating a detailed arrangement of the image combining section 120 in accordance with an embodiment of the present invention. The image combining section 120 includes a combining section 702 and a bit expanding section 701.

As shown in FIG. 7, the image combining section 120 is configured to receive the original image data and the cfip image data.

The bit expanding section 701 is configured to receive the cfip image data put in the LSB-bit position of the attribute data region. The bit expanding section 701 can convert the cfip image data into image data of CMYK data each being 1-bit data. More specifically, the bit expanding section 701 places the cfip image data on 4 planes of CMYK colors.

More specifically, the bit expanding section 701 receives 1-bit cfip image data, and produces the above-described image data of CMYK data each being 1-bit data with reference to each pixel value (i.e., 0 or 1) of the cfip image data or depending on color settings of the cfip image. For example, when a bit value representing the cfip image data is "1" and the color of the cfip image is M, the bit expanding section 701 outputs 4-bit cfip image data including C being valued 0, M being valued 1, Y being valued 0, and K being valued 0.

Furthermore, when a bit value representing the cfip image data is "0" and the color of the cfip image is M, the bit expanding section 701 outputs 4-bit cfip image data including C being valued 0, M being valued 0, Y being valued 0, and K being valued 0.

Next, the combining section 702 simply combines (using an OR operation) the original image data including CMYK data each being already converted into 1-bit data with the cfip image data including respective color data each being 1-bit data, produced from the bit expanding section 701. Thus, the combining section 702 produces composite image data including respective color data each being 1-bit data.

As described above, the first exemplary embodiment executes the chip-to-chip data transfer processing between the packet transmitting section 115 and the packet receiving section 116. To efficiently execute the data transfer processing, the first exemplary embodiment executes the lossless compression applied again to the attribute data being subjected to the bit replacement processing. However, when no data transfer is necessary between two chips, or when lower data transfer efficiency is acceptable, the present exemplary embodiment can cancel the lossless compression applied to the attribute data after the bit replacement processing is finished.

Furthermore, according to the first exemplary embodiment, the 1-bit cfip image data can be put in any position in the attribute data region other than the LSB-bit position. For example, the cfip image data can be put in a MSB-bit position or in an intermediate-bit position. Furthermore, an accommodating bit can be selected according to register settings.

Furthermore, according to the first exemplary embodiment, the cfip image data is not limited to 1-bit data. For example, the cfip image data can be 2-bit data per pixel. The cfip image can be CMYK mixed color image. In this case, the cfip image will occupy at least two bits of the attribute data accommodating region.

According to a system preparing a 8-bit region as described above, the information having large effect on the quality improvement of the attribute data may have large effect on the image processing or may have small effect on the image processing.

It is needless to say that performing the image processing not only based on the attribute having large effect but also based on the attribute having small effect can obtain high quality original image data, compared to performing the image processing based on only the attribute having large effect.

However, the effect of improving the quality of the original image data will be weakened when the image combining section 120 combines the original image data with the cfip image.

Therefore, if the attribute having small effect can be partly overwritten by the cfip image data, there will be no adverse effect on the quality.

Second Exemplary Embodiment

Figure 8:
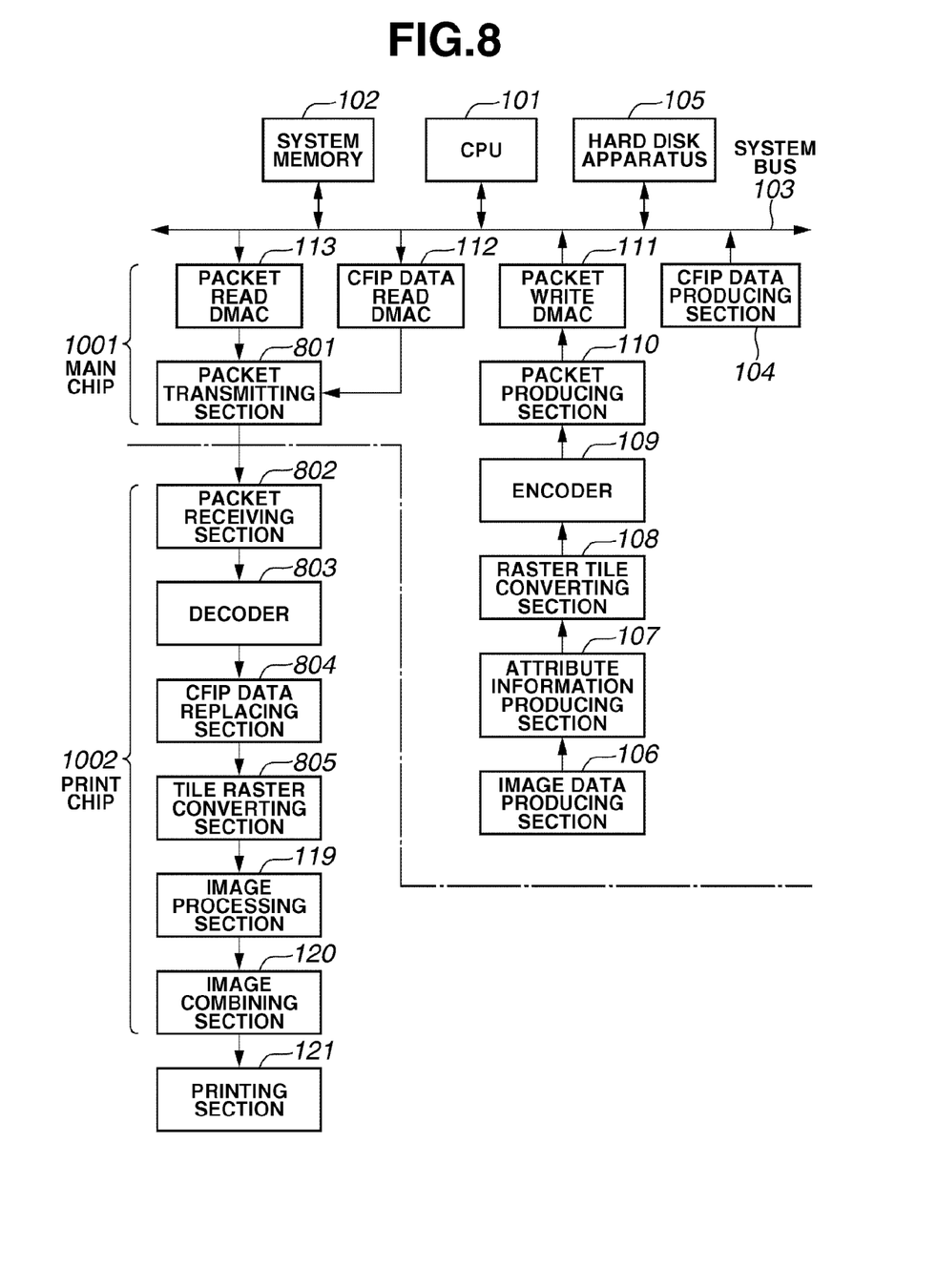
FIG. 8 is a block diagram illustrating an arrangement of an image processing apparatus in accordance with a second exemplary embodiment of the present invention.

FIG. 8 is a block diagram illustrating an arrangement of an image processing apparatus in accordance with a second exemplary embodiment of the present invention.

According to the above-described first exemplary embodiment, the packet transmitting section 115 is required to once expand the attribute data being lossless compressed in the encoder 109. Then, the first exemplary embodiment executes the replacement processing for the cfip image data. After the replacement processing is accomplished, the packet transmitting section 115 performs lossless compression to produce the packet data again and transmits the packet data to the print chip 1002.

The method of the first exemplary embodiment is characterized by the operations of expanding lossless compressed attribute data and again compressing the expanded attribute data. Therefore, compression of the attribute data may not always be successful, or the data size may become larger compared to the data size prior to the lossless compression.

The data transfer amount between the main chip 1001 and the print chip 1002 may be relatively large, which can create a bottleneck in the system.

The second exemplary embodiment is characterized in that no expansion processing is applied to the packet data and a packet transmitting section 801 can transmit the non-expanded packet data together with the cfip image data to the print chip 1002. In the second exemplary embodiment, the print chip 1002 performs the replacement processing. Thus, the second exemplary embodiment can reduce the data amount to be transferred between two chips.

More specifically, the print chip 1002 has a packet receiving section 802 that can receive the packet data including the original image data and the attribute data. The packet receiving section 802 can also receive the cfip image data. A decoder 803 can receive the packet data. A cfip data replacing section 804 can receive the cfip image data.

The decoder 803 can expand the compressed original image data and the attribute data involved in the packet data, and sends the expanded original image data and the attribute data to the cfip data replacing section 804. The cfip data replacing section 804 overwrites a 1-bit position of the attribute data region by the cfip image data, similar to the first exemplary embodiment, The succeeding processing is identical to the processing described in the first exemplary embodiment. The image processing section 119 performs the image processing to the original image data and does not perform the image processing to the cfip image data, similar to the first exemplary embodiment.

Thus, the present exemplary embodiment can prevent the contents of the cfip image from being damaged during the image processing. As a result, the quality of the cfip image does not deteriorate. The present exemplary embodiment can prevent the cfip image from appearing on the original as warning letters in a visible state.

As described above, the above-described exemplary embodiments produce high-quality composite image data without providing a transfer path dedicated for the cfip image data. Furthermore, the above-described exemplary embodiments perform the lossy compression applied to the original image data to reduce a required memory capacity and realize reduction in the data transfer amount.

Furthermore, the first exemplary embodiment can realize high quality printing in the ordinary printing operation by using 8-bit attribute data.

Furthermore, the second exemplary embodiment can suppress the transfer data amount between two chips.

Other Exemplary Embodiments

Furthermore, software program code for realizing the functions of the above-described exemplary embodiments can be supplied, via a storage medium (or a recording medium), to a system or an apparatus. A computer (or CPU or MPU) in the system or the apparatus can read the program code stored in the storage medium and can execute the readout program.

In this case, the program code read out from the storage medium can realize the functions of the exemplary embodiments. The equivalents of programs can be used if they possess comparable functions. Accordingly, when the functions or processes of the exemplary embodiments are realized by a computer, program code installed in the computer and a recording medium storing the program are used to implement the present invention.

In other words, the present invention encompasses a computer program that can realize the functions or processes of the exemplary embodiments or any recording medium that can store the program. In this case, the type of program can be selected from any one of object codes, interpreter programs, and OS script data. A recording medium supplying the program can be selected from any one of a flexible disk, a hard disk, an optical disk, a magneto-optical disk, an MO, a CD-ROM, a CD-R, a CD-RW, a magnetic tape, a nonvolatile memory card, a ROM, and a DVD (DVD-ROM, DVD-R).

The method for supplying the program includes accessing a home page on the Internet using the browsing function of a client computer, when the home page allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different home pages. Namely, the present invention encompasses WWW servers that allow numerous users to download the program files so that the functions or processes of the present invention can be realized on their computers.

Furthermore, enciphering the programs of the present invention and storing the enciphered programs in a CD-ROM or comparable recording medium is a practical method when the programs of the present invention are distributed to the users. The authorized users (i.e., users satisfying predetermined conditions) are allowed to download key information from a home page on the Internet. The users can decipher the programs with the obtained key information and can install the programs on their computers. When the computer reads and executes the installed programs, the functions of the above-described exemplary embodiments can be realized.

Furthermore, it is noted that not only the functions of the above-described exemplary embodiments can be realized by a computer that executes the programs, but also an operating system (OS) running on the computer can execute part or all of the actual processing based on instructions of the programs.

Furthermore, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

When the present invention is applied to the above-described recording medium, the recording medium stores the program code corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. An image processing apparatus for generating combined data from first image data and second image data, comprising:
   a putting unit configured to put the second image data into a part of attribute data attached to the first image data; and
   a combining unit configured to generate the combined data on the basis of the first image data and the attribute data including the second image data.

2. The image processing apparatus according to claim 1, further comprising:
   a compression unit configured to compress, prior to combining by the combining unit, the first image data and the attached attribute data including the second image data, the compression unit performing reversible compression of the attribute data and irreversible compression of the first image data.

3. The image processing apparatus according to claim 2, wherein the image data and the attribute data are separately compressed and stored in a memory.

4. The image processing apparatus according to claim 2, wherein the compressed first image data and the compressed attribute data are packed as a packet in units of predetermined tiles and stored in the memory.

5. The image processing apparatus according to claim 1, wherein the second image data is an image having each pixel expressed by 1 bit.

6. The image processing apparatus according to claim 1, further comprising:
   an image processing unit configured to perform image processing of the first image data based on the attached attribute data prior to combining by the combining unit.

7. A method for generating combined data from first image data and second image data, the method comprising:
   putting the second image data into a part of attribute data attached to the first image data; and
   generating the combined data on the basis of the first image data and the attribute data including the second image data.

8. The method according to claim 7, further comprising:
   compressing, prior to combining data, the first image data and the attached attribute data including the second image data, performing reversible compression of the attribute data and irreversible compression of the first image data.

9. The method according to claim 8, wherein the image data and the attribute data are separately compressed and stored in a memory.

10. The method according to claim 8, wherein the compressed first image data and the compressed attribute data are packed as a packet in units of predetermined tiles and stored in the memory.

11. The method according to claim 7, wherein the second image data is an image having each pixel expressed by 1 bit.

12. The method according to claim 7, further comprising:
   performing image processing of the first image data based on the attached attribute data prior to combining data.

* * * * *